United States Patent
Chuang et al.

(10) Patent No.: US 9,609,239 B2
(45) Date of Patent: Mar. 28, 2017

(54) INFRARED IMAGE SENSOR

(71) Applicant: TAIWAN SEMICONDUCTOR MANUFACTURING CO., LTD., Hsinchu (TW)

(72) Inventors: Chun-Hao Chuang, Hsinchu (TW); Chien-Hsien Tseng, Hsinchu (TW); Kazuaki Hashimoto, Hsinchu County (TW); Keng-Yu Chou, Kaohsiung (TW); Wei-Chieh Chiang, Changhua County (TW); Yuichiro Yamashita, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 14/831,820

(22) Filed: Aug. 20, 2015

(65) Prior Publication Data

US 2017/0054924 A1 Feb. 23, 2017

(51) Int. Cl.
*H04N 5/33* (2006.01)
*H04N 5/225* (2006.01)

(52) U.S. Cl.
CPC .......... *H04N 5/332* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 2009/0200469 | A1* | 8/2009 | Morin | H01L 27/14621 250/338.1 |
| 2010/0102366 | A1* | 4/2010 | Lee | H01L 27/14609 257/291 |
| 2012/0056073 | A1* | 3/2012 | Ahn | H01L 27/14609 250/208.1 |
| 2012/0086093 | A1* | 4/2012 | Otsuka | H01L 27/14621 257/432 |
| 2012/0243077 | A1* | 9/2012 | Osawa | G02B 3/0056 359/356 |
| 2012/0268566 | A1* | 10/2012 | Kim | H04N 5/3696 348/46 |

(Continued)

OTHER PUBLICATIONS

U.S. Appl. No. 14/486,803, filed Sep. 15, 2014.
U.S. Appl. No. 14/505,340, filed Oct. 2, 2014.

*Primary Examiner* — Timothy J Henn
(74) *Attorney, Agent, or Firm* — Maschoff Brennan

(57) ABSTRACT

An image sensor includes a substrate, a plurality of visible light photosensitive devices, an infrared photosensitive device, a plurality of color filters, an infrared band-pass filter, a micro-lens layer and an infrared filter layer. The plurality of visible light photosensitive devices and the infrared photosensitive device are disposed in the substrate, wherein the plurality of visible light photosensitive devices and the infrared photosensitive device are arranged in an array. The plurality of color filters are respectively disposed to cover the plurality of visible light photosensitive device. In addition, the infrared band-pass filter disposed to cover the infrared photosensitive device. Furthermore, the micro-lens layer is disposed on the plurality of color filters and the infrared band-pass filter. The infrared filter layer is disposed to cover the plurality of visible light photosensitive device.

18 Claims, 4 Drawing Sheets

(56) References Cited

U.S. PATENT DOCUMENTS

| | | | | |
|---|---|---|---|---|
| 2014/0078356 A1* | 3/2014 | Vaartstra | ........... | H01L 27/14629 348/273 |
| 2014/0284746 A1* | 9/2014 | Suzuki | .............. | H01L 27/14618 257/432 |
| 2015/0054962 A1* | 2/2015 | Borthakur | .............. | H04N 5/332 348/164 |
| 2015/0200220 A1* | 7/2015 | Juenger | ............. | H01L 27/14621 257/432 |
| 2015/0311239 A1* | 10/2015 | Won | .................. | H01L 27/14621 257/432 |
| 2015/0381907 A1* | 12/2015 | Boettiger | ............... | H04N 5/332 348/164 |
| 2016/0099280 A1* | 4/2016 | Huang | .............. | H01L 27/14621 250/208.1 |
| 2016/0116653 A1* | 4/2016 | Murayama | ........ | H01L 27/14618 359/359 |

\* cited by examiner

INFRARED IMAGE SENSOR

BACKGROUND

Image sensors are usually operated to sense light. Typically, the image sensors include complementary metal-oxide-semiconductor (CMOS) image sensors (CIS) and charge-coupled device (CCD) sensors, which are widely used in various applications such as digital still camera (DSC), mobile phone camera, digital video (DV) and digital video recorder (DVR) applications. These image sensors absorb light and convert the sensed light into digital data or electrical signals.

When a trend of electronic products including image sensors, such as mobile phone cameras, is developed toward more and more compact design, camera modules of the mobile phone cameras need to be scaled down. However, as the thickness of the mobile phones keeps shrinking down, it is more difficult to produce the camera modules with a desired thickness for the compact mobile phone camera.

Accordingly, while conventional image sensors may have been generally adequate for certain purposes, they have not been entirely satisfactory in every aspect.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
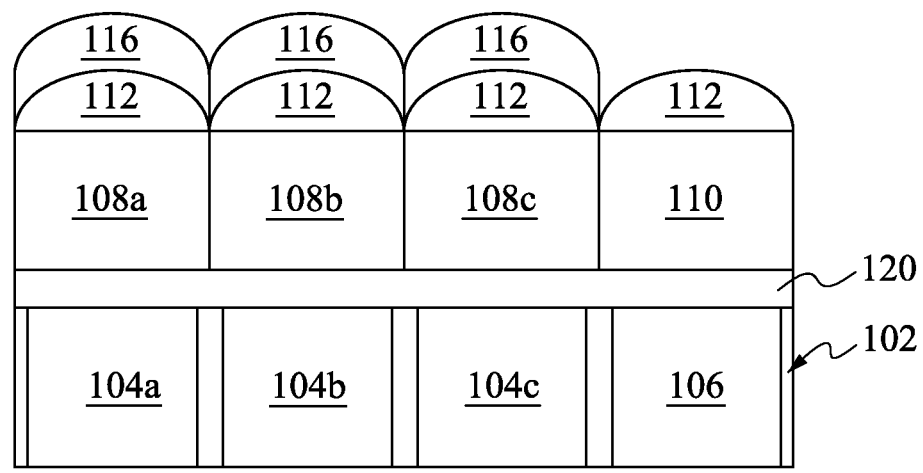
FIGS. 1-5 are schematic cross-sectional views of an image sensor in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

Terms used herein are only used to describe the specific embodiments, which are not used to limit the claims appended herewith. For example, unless limited otherwise, the term "one" or "the" of the single form may also represent the plural form. The terms such as "first" and "second" are used for describing various devices, areas and layers, etc., though such terms are only used for distinguishing one device, one area or one layer from another device, another area or another layer. Therefore, the first area can also be referred to as the second area without departing from the spirit of the claimed subject matter, and the others are deduced by analogy. In addition, the present disclosure may repeat reference numerals and/or letters in the various examples. This repetition is for the purpose of simplicity and clarity and does not in itself dictate a relationship between the various embodiments and/or configurations discussed. As used herein, the term "and/or" includes any and all combinations of one or more of the associated listed items.

In photography, infrared radiation (IR) needs to be screened out from incident radiation. Typically, an image module, such as a camera module, includes an image sensor and a lens module disposed over the image sensor, in which the lens module includes an infrared filter element covering the image sensor to filter out the IR from the incident radiation before the incident radiation enters the image sensor. Thus, the image sensor can only receive visible radiation and reproduce a visual-like image. However, the infrared filter element includes a glass substrate and an infrared filter layer coating on the glass substrate, and the glass substrate is too thick to thin the camera module for an advanced electronic application, such as a mobile phone camera.

Embodiments of the present disclosure are directed to providing an image sensor, and a method for manufacturing the image sensor, in which the image sensor includes a substrate; a plurality of visible light photosensitive devices disposed in the substrate; an infrared photosensitive device disposed in the substrate, wherein the plurality of visible light photosensitive devices and the infrared photosensitive device are arranged in an array; a plurality of color filters respectively disposed to cover the plurality of visible light photosensitive devices; an infrared band-pass filter disposed to cover the infrared photosensitive device; a micro-lens layer disposed on the plurality of color filters and the infrared band-pass filter; and an infrared filter layer disposed to cover the plurality of visible light photosensitive device. With the infrared band-pass filter and the corresponding infrared photosensitive device, a pure IR signal of incident radiation can be obtained. In addition, the image sensor includes an embedded infrared filter layer, so that pure visible light signals can also be obtained, and a glass substrate of an infrared filter element of a typical image module can be eliminated, thereby significantly reducing the thickness of the image module and the image flare reduction can also be avoided Furthermore, the image sensor may further include a light guide disposed between the infrared photosensitive device and the plurality of visible light photosensitive devices, so the quantum efficiency of the image sensor is enhanced, and the IR signal and visible light signal can be more differentiable to achieve a better resolution.

Since the pure IR signal and pure visible light signal can be simultaneously obtained, a glass substrate of an infrared filter element of a typical image module can be eliminated, thereby achieving cost-down, and the thickness of the image module can be significantly reduced. In addition, since the image sensor may further include a light guide disposed between the infrared photosensitive device and the plurality of visible light photosensitive devices, the quantum efficiency of the image sensor is enhanced.

FIG. 1 is a schematic cross-sectional view of an image sensor device in accordance with some embodiments. In some embodiments, the image sensor 100 is a CMOS image sensor device, which may be operated for sensing incident radiation (not shown). In some embodiments, the image sensor 100 is a charge-coupled device (CCD) image sensor. In some embodiments, the image sensor 100 can simultaneously receive a pure IR signal and visible light signal of the incident radiation due to existence of both visible pixels and IR pixel. In addition, the image sensor 100 can be fabricated without an additional infrared filter element disposed over the image sensor 100.

Various types of image sensors, such as exemplary image sensors 100, 200, 300, 400 and 500 in accordance with some embodiments are respectively shown in FIGS. 1-5. These image sensors 100, 200, 300, 400 and 500 are described in detail hereinafter.

As shown in FIG. 1, in some embodiments, an exemplary image sensor 100 includes a substrate 102; a plurality of visible light photosensitive devices 104a, 104b and 104c; an infrared photosensitive device 106; a plurality of color filters 108a, 108b and 108c; an infrared band-pass filter 110; a micro-lens layer 112; and an infrared filter layer 116. The substrate 102 may be a semiconductor substrate. The substrate 102 may be formed of a single-crystalline semiconductor material or a compound semiconductor material. For example, the substrate 102 is a silicon substrate. In some embodiments, carbon, germanium, gallium, arsenic, nitrogen, indium, phosphorus, and/or the like, may be included in the substrate 102.

The exemplary image sensor 100 may be composed of various pixels, and each pixel includes one of the visible light photosensitive devices 104a, 104b and 104c, and the infrared photosensitive device 106. The visible light photosensitive devices 104a, 104b and 104c, and the infrared photosensitive device 106 can sense the radiation and convert optical signals of the radiation into electrical signals. In some embodiments, the exemplary image sensor 100 may include various visible light photosensitive devices 104a, various visible light photosensitive devices 104b and various visible light photosensitive devices 104c. In some embodiments, the image sensor 100 further includes various infrared photosensitive devices 106. The visible light photosensitive devices 104a, 104b and 104c and the infrared photosensitive devices 106 are disposed in the substrate 102, and are arranged in an array (not shown). Each of the visible light photosensitive devices 104a, 104b and 104c may be used to sense one type of visible light such as red light, blue light or green light. For example, the visible light photosensitive devices 104a, 104b and 104c are respectively used to sense different types of visible light, such as red light, blue light and green light. In some exemplary examples, the visible light photosensitive devices 104a, 104b and 104c include at least one red light photosensitive device, at least one blue light photosensitive device, and at least one green light photosensitive device. In addition, the infrared photosensitive devices 106 are used to sense an infrared light. In some embodiments, the visible light photosensitive devices 104a, 104b and 104c and the infrared photosensitive devices 106 are photodiodes.

Still referring to FIG. 1, in some exemplary examples, the color filters 108a, 108b, 108c respectively correspond to and are disposed to cover the plurality of visible light photosensitive devices 104a, 104b and 104c. The infrared band-pass filter 110 corresponds to and is disposed to cover to the infrared photosensitive device 106. In some embodiments, the infrared band-pass filter 110 may include a titanium film with a thickness smaller than 1000 Angstroms. In some embodiments, the infrared band-pass filter 110 includes a plasmonic structure, and the plasmonic structure may be formed from metals.

As shown in FIG. 1, the color filters 108a, 108b and 108c are located respectively corresponding to the visible light photosensitive devices 104a, 104b and 104c. In some embodiments, the image sensor 100 may include various visible light photosensitive devices 104a, various visible light photosensitive devices 104b, various visible light photosensitive devices 104b and various infrared photosensitive devices 106, so that the visible light photosensitive devices 104a, 104b and 104c can respectively receive the radiations which have been filtered by the color filters 108a, 108b and 108c, and the infrared photosensitive devices 106 can receive the radiations which have been filtered by the infrared band-pass filter 110.

In some exemplary examples, the color filter 108a is a red color filter, and the visible light photosensitive device 104a is a red light photosensitive device for receiving the radiations filtered by the red color filter. The color filter 108b is a blue color filter, and the visible light photosensitive device 104b is a blue light photosensitive device for receiving the radiations filtered by the blue color filter. The color filter 108c is a green color filter, the visible light photosensitive device 104c is a green light photosensitive device for receiving the radiations filtered by some of the green color filter, and the infrared photosensitive device 106 receives the radiations filtered by the infrared band-pass filter 110.

As shown in FIG. 1, the exemplary micro-lens layer 112 is disposed on the color filters 108a, 108b and 108c and the infrared band-pass filter 110. In some example, the micro-lens layer 112 includes various micro-lenses, and locations and areas of the micro-lenses respectively correspond to those of the color filters 108a, 108b and 108c. The incident radiations are condensed by the micro-lenses, and then are converged on the color filters 108a, 108b and 108c correspondingly.

In some embodiments, the infrared filter layer 116 is disposed to cover the plurality of visible light photosensitive device. As shown in FIG. 1, the exemplary infrared filter layer 116 may be disposed conformally on the micro-lens layer, so that the top surface profile of the infrared filter layer 116 is in a rounding shape. In some exemplary examples, the top surface profile of the infrared filter layer 116 is substantially the same as a top surface profile of the micro-lens layer 112, and the micro-lens layer 112 and the infrared filter layer 116 collectively form a double-lens structure. When the exemplary infrared filter layer 116 is not conformally formed on the micro-lens layer, a light guide (as shown in FIGS. 2-5, described below in detail) may be further included in the image sensor 100. The infrared filter layer 116 may be made of an infrared cut-off light filter membrane or an IR cut filter membrane. Materials of the infrared filter layer 116 are not particular limited, in some embodiments, as long as the transmittance of light rays with the wavelength between 400 nanometers to 800 nanometers is permitted, and the transmittance of light rays with the wavelength between 850 nanometers to 1300 nanometers is substantially inhibited. In some embodiments, the infrared filter 116 may be formed as a laminated structure including one or more layers. In some embodiments, the infrared filter layer 116 can filter out infrared radiation from the incident radiation, and the image sensor 100 can convert optical signals of the incident radiation with no infrared radiation into digital data or electrical signals at the visible pixels, so as to reproduce a visual-like image. Thus, the image module (not shown) employing the image sensor 100 can be fabricated without an additional infrared filter element disposed over the image sensor 100.

In some embodiments, the infrared filter layer 116 includes an absorptive infrared filter structure (not shown) for reducing the infrared reflection. The absorptive infrared filter structure may be formed from absorptive materials, such as phosphorus pentoxide ($P_2O_5$) and cupric oxide (CuO). In some embodiments, the infrared filter layer 116 includes a reflective infrared filter structure (not shown). For example, the reflective infrared filter structure may be a multi-film stacked structure, and films of the multi-film stacked structure have different refractive indexes in an infrared region for reflecting the infrared radiation. By integrating the infrared filter layer 116 into the image sensor 100, an additional infrared filter element can be omitted. Thus, a glass substrate of the infrared filter element can be removed from the lens module (not shown) employing the image sensor 100 to reduce the thickness of the lens module, so that the image module is effectively thinned. Therefore, the image module can be implemented into a thin electronic device, such as a thin mobile phone.

In various examples, as shown in FIG. 1, the image sensor 100 optionally includes an anti-reflective coating (ARC) layer 120, in which the anti-reflective coating layer 120 is disposed directly on the plurality of visible light photosensitive devices and the infrared photosensitive device. Thus, the anti-reflective coating layer 120 is located between the substrate 102 and the color filters 108a, 108b and 108c and between the substrate 102 and the infrared band-pass filter 110. With the anti-reflective coating layer 120, the amount of the radiation entering the visible light photosensitive devices 104a, 104b and 104c and the infrared photosensitive devices 106 is increased.

Still referring to FIG. 1, with the infrared filter layer 116 and the infrared band-pass filter 110, a pure IR electrical signal and visible light electrical signals can be simultaneously obtained, to benefit night visibility and avoid sunshine interference. Therefore, an additional infrared filter element can be omitted, and a glass substrate holding the infrared filter element can be removed from the lens module employing the image sensor 100 to reduce the thickness of the lens module, thereby effectively thinning the image module. As such, the image module can be implemented into a thin electronic device, such as a thin mobile phone.

Figure 2:
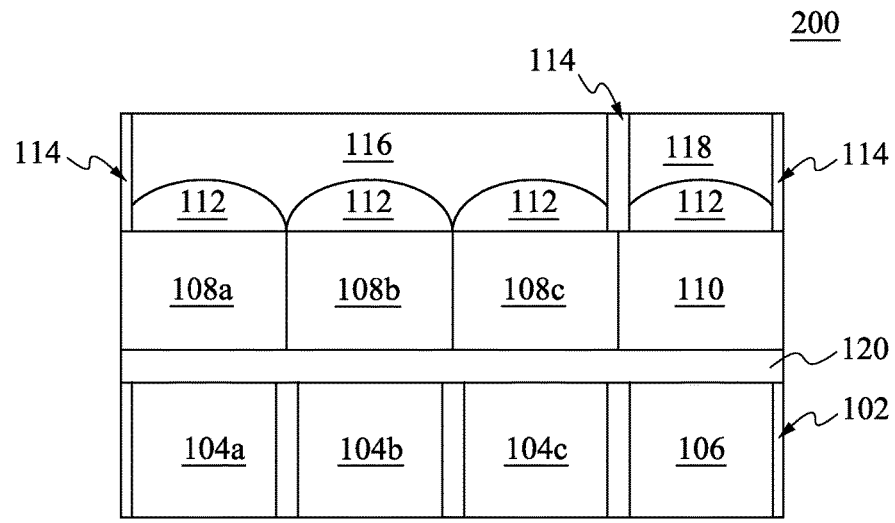

FIG. 2 is a schematic cross-sectional view of an image sensor in accordance with some embodiments, where components and features similar to those of the previous embodiment are identified with the same or similar reference numerals. As shown in FIG. 2, in some embodiments, an exemplary image sensor 200 includes a substrate 102; a plurality of visible light photosensitive devices 104a, 104b and 104c; an infrared photosensitive device 106; a plurality of color filters 108a, 108b and 108c; an infrared band-pass filter 110; a micro-lens layer 112; an infrared filter layer 116; a light guide 114; and a transparent layer 118.

Referring to FIG. 2, this embodiment is substantially the same as the previous embodiment, except that the infrared filter layer 116 disposed on the micro-lens layer 112 has a substantially planar top surface, and the image sensor 200 further includes a light guide 114 and a transparent layer 118. More particularly, in some embodiment, as shown in FIG. 2, the light guide 114 is disposed between the infrared photosensitive device 106 and the plurality of visible light photosensitive devices 104a, 104b and 104c. In some embodiment, the transparent layer 118 is disposed to cover the infrared photosensitive device 106. In detail, referring to FIG. 2, the light guide 114 of this embodiment is interposed between the infrared filter layer 116 and the transparent layer 118. In some other embodiments, the light guide of the present disclosure may further extend down to the anti-reflective coating (ARC) layer 120 such that the light guide is also interposed between the color filter 108c and the infrared band-pass filter 110 (not shown). According to some aspects of the present disclosure, materials of the exemplary light guide 114 are not particularly limited, as long as they can provide the exemplary light guide 114 with a refractive index less than those of the color filters 108a, 108b and 108c, the infrared filter layer 116, the infrared band-pass filter 110 and the transparent layer 118. In other words, the exemplary light guide 114 has a refractive index less than the elements adjacent thereto. Materials of the exemplary transparent layer 118 are not particularly limited, and can be any conventional transparent photo-resist in the art. Details regarding this embodiment that are similar to those for the previously described embodiment will not be repeated herein.

Figure 3:
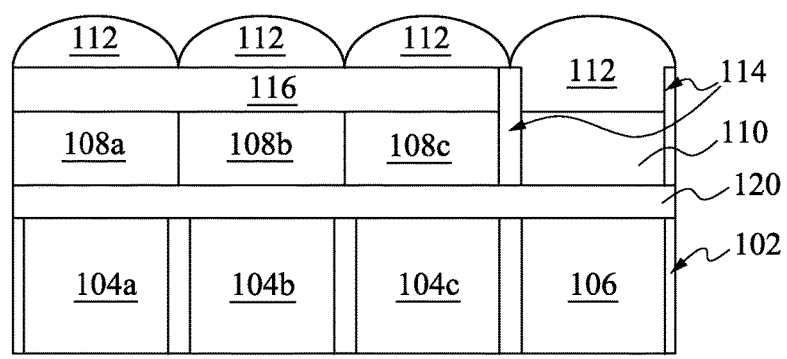

FIG. 3 is a schematic cross-sectional view of an image sensor in accordance with some embodiments, where components and features similar to those of the previous embodiment are identified with the same or similar reference numerals. As shown in FIG. 3, in some embodiments, an exemplary image sensor 300 includes a substrate 102; a plurality of visible light photosensitive devices 104a, 104b and 104c; an infrared photosensitive device 106; a plurality of color filters 108a, 108b and 108c; an infrared band-pass filter 110; a micro-lens layer 112; an infrared filter layer 116; and a light guide 114.

Referring to FIG. 3, this embodiment is substantially the same as the previous embodiment in reference to FIG. 2, except that the infrared filter layer 116 is disposed between the color filters 108a, 108b and 108c and the micro-lens layer 112, and a transparent layer 118 may be not employed. More particularly, in some embodiment, as shown in FIG. 3, the light guide 114 is disposed between the infrared photosensitive device 106 and the plurality of visible light photosensitive devices 104a, 104b and 104c. In detail, referring to FIG. 3, the light guide 114 of this embodiment is interposed between the infrared filter layer 116 and a portion of the micro-lens layer 112 on the infrared band-pass filter 110, and also between the color filter 108c and the infrared band-pass filter 110. According to some aspects of the present disclosure, materials of the exemplary light guide 114 are not particularly limited, as long as they can provide the exemplary light guide 114 with a refractive index less than those of the color filters 108a, 108b, 108c, the infrared filter layer 116, the infrared band-pass filter 110 and the transparent layer 118, as described above. In other words, the exemplary light guide 114 has a refractive index less than the elements adjacent thereto. Details regarding this embodiment that are similar to those for the previously described embodiment will not be repeated herein.

Figure 4:
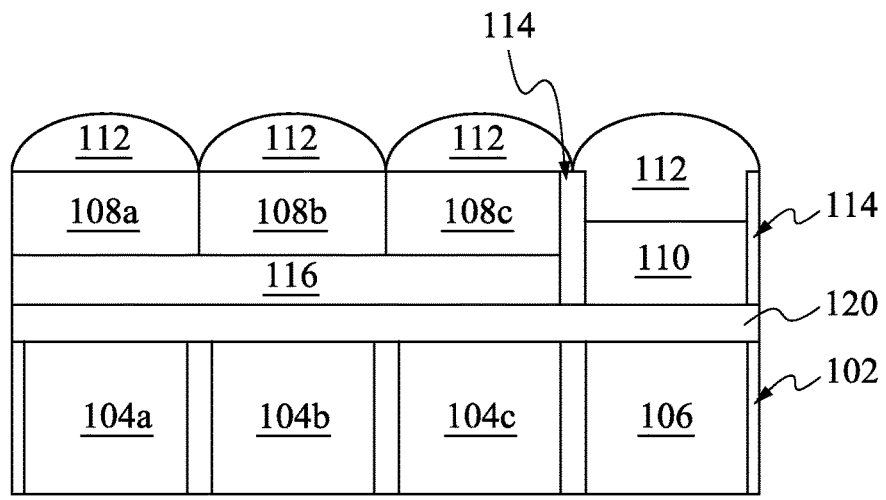

FIG. 4 is a schematic cross-sectional view of an image sensor in accordance with some embodiments, where components and features similar to those of the previous embodiment are identified with the same or similar reference numerals. As shown in FIG. 4, in some embodiments, an exemplary image sensor 400 includes a substrate 102; a plurality of visible light photosensitive devices 104a, 104b and 104c; an infrared photosensitive device 106; a plurality of color filters 108a, 108b and 108c; an infrared band-pass filter 110; a micro-lens layer 112; an infrared filter layer 116; and a light guide 114.

Referring to FIG. 4, this embodiment is substantially the same as the previous embodiment in reference to FIG. 3, except that the infrared filter layer 116 is disposed between the color filters 108a, 108b and 108c and the visible light photosensitive devices 104a, 104b and 104c. More particularly, in some embodiment, as shown in FIG. 4, the light guide 114 is disposed between the infrared photosensitive device 106 and the plurality of visible light photosensitive devices 104a, 104b and 104c. In detail, referring to FIG. 4, the light guide 114 of this embodiment is interposed between the infrared filter layer 116 and the infrared band-pass filter 110, and also between the color filter 108c and the infrared band-pass filter 110, and further between the color filter 108c and a portion of the micro-lens layer 112 on the infrared band-pass filter 110. According to some aspects of the present disclosure, materials of the exemplary light guide 114 are not particularly limited, as long as they can provide the exemplary light guide 114 with a refractive index less than those of the color filters 108a, 108b, 108c, the infrared filter layer 116, the infrared band-pass filter 110 and the transparent layer 118, as described above. In other words, the exemplary light guide 114 has a refractive index less than the elements adjacent thereto. Details regarding this embodiment that are similar to those for the previously described embodiment will not be repeated herein.

Figure 5:
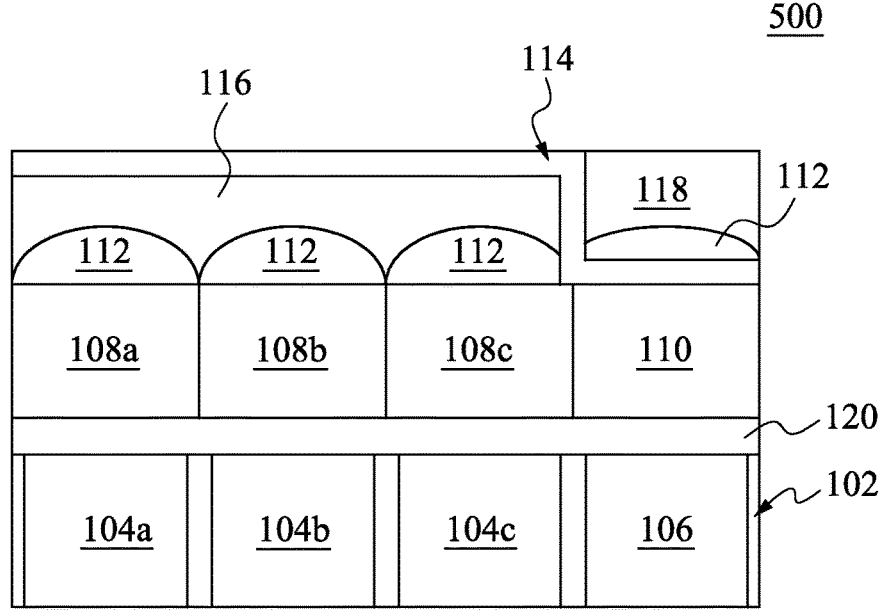

FIG. 5 is a schematic cross-sectional view of an image sensor in accordance with some embodiments, where components and features similar to those of the previous embodiment are identified with the same or similar reference numerals. As shown in FIG. 5, in some embodiments, an exemplary image sensor 400 includes a substrate 102; a plurality of visible light photosensitive devices 104a, 104b and 104c; an infrared photosensitive device 106; a plurality of color filters 108a, 108b and 108c; an infrared band-pass filter 110; a micro-lens layer 112; an infrared filter layer 116; a light guide 114 and a transparent layer 118.

Referring to FIG. 5, this embodiment is substantially the same as the previous embodiment in reference to FIG. 2, except that the light guide 114 is not only interposed between the infrared filter layer 116 and the transparent layer 118, but also extends above the infrared filter layer 116 and below a portion of the micro-lens layer 112. More specifically, the light guide 114 may be disposed between the infrared band-pass filter 110 and a portion of the micro-lens layer 112 on the infrared band-pass filter 110. According to some aspects of the present disclosure, materials of the exemplary light guide 114 are not particularly limited, as long as they can provide the exemplary light guide 114 with a refractive index less than those of the color filters 108a, 108b and 108c, the infrared filter layer 116, the infrared band-pass filter 110 and the transparent layer 118, as described above. In other words, the exemplary light guide 114 has a refractive index less than the elements adjacent thereto. Details regarding this embodiment that are similar to those for the previously described embodiment will not be repeated herein.

Figure 6:
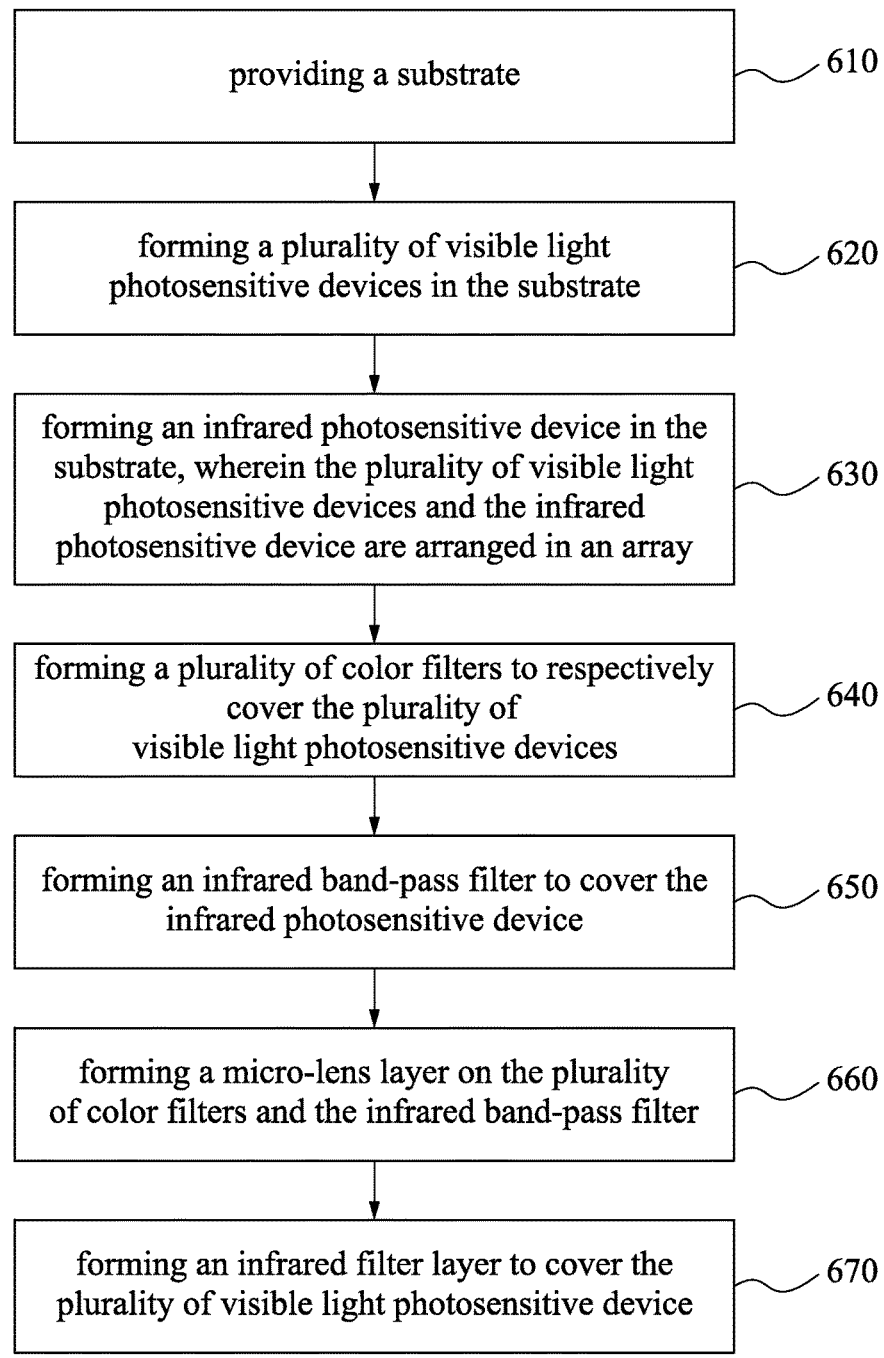
FIG. 6 is a flow chart of a method for manufacturing an image sensor in accordance with some embodiments.

FIG. 6 is a flow chart of a method for manufacturing an image sensor in accordance with some embodiments. The method 600 begins at step 610 by providing a substrate 102. In step 620, various visible light photosensitive devices 104a, 104b and 104c and at least one infrared photosensitive device 106 are formed in the substrate 102 as shown in FIGS. 1-5. The substrate 102 may be formed of a single-crystalline semiconductor material or a compound semiconductor material. For example, silicon, carbon, germanium, gallium, arsenic, nitrogen, indium, phosphorus, and/or the like, may be included in the substrate 102.

In step 630, the infrared photosensitive device 106 is formed in the substrate 102 as shown in FIGS. 1-5, wherein the plurality of visible light photosensitive devices 104a, 104b and 104c and the infrared photosensitive device 106 are arranged in an array (not shown). The visible light photosensitive devices 104a, 104b and 104c, and the infrared photosensitive device 106 can sense the radiation and convert optical signals of the radiation into electrical signals. In some embodiments, the exemplary image sensor may include various visible light photosensitive devices 104a, various visible light photosensitive devices 104b and various visible light photosensitive devices 104c. In some embodiments, the image sensor includes various infrared photosensitive devices 106 as shown in FIGS. 1-5. Each of the visible light photosensitive devices 104a, 104b and 104c may be used to sense one type of visible light such as red light, blue light or green light. For example, the visible light photosensitive devices 104a, 104b, 104c are respectively used to sense different types of visible light, such as red light, blue light and green light. In some exemplary examples, the visible light photosensitive devices 104a, 104b, 104c include at least one red light photosensitive device, at least one blue light photosensitive device, and at least one green light photosensitive device. In addition, the infrared photosensitive devices 106 are used to sense an infrared light. In some embodiments, the visible light photosensitive devices 104a, 104b and 104c and the infrared photosensitive devices 106 are photodiodes.

In step 640, the color filters 108a, 108b and 108c respectively correspond and are disposed to cover the plurality of visible light photosensitive devices as shown in FIGS. 1-5, and in step 650, the infrared band-pass filter 110 corresponds and is disposed to cover to the infrared photosensitive device 106. In some embodiments, the infrared band-pass filter 110 may include a titanium film with a thickness smaller than 1000 Angstroms. In some embodiments, the infrared band-pass filter 110 includes a plasmonic structure, and the plasmonic structure may be formed from metals.

In some exemplary examples, the color filters 108a, 108b and 108c are located correspondingly to the visible light photosensitive devices 104a, 104b and 104c respectively as shown in FIGS. 1-5. In some embodiments, the image sensor according to the present disclosure may include various visible light photosensitive devices 104a, various visible light photosensitive devices 104b, various visible light photosensitive devices 104b and various infrared photosensitive devices 106, so that the visible light photosensitive devices 104a, 104b and 104c can respectively receive the radiations which have been filtered by the color filters 108a, 108b, 108c, and the infrared photosensitive devices 106 can respectively receive the radiations which have been filtered by the infrared band-pass filter 110.

In some exemplary examples, the color filter 108a is a red color filter, and the visible light photosensitive device 104a is a red light photosensitive device for receiving the radiations filtered by the red color filter. The color filter 108b is a blue color filter, and the visible light photosensitive device 104b is a blue light photosensitive device for receiving the radiations filtered by the blue color filter. The color filter 108c is a green color filter, the visible light photosensitive device 104c is a green light photosensitive device for receiving the radiations filtered by some of the green color filter, and the infrared photosensitive device 106 receives the radiations sequentially filtered by the infrared band-pass filter 110.

In step 660, the exemplary micro-lens layer 112 is disposed on the color filters 108a, 108b and 108c and the infrared band-pass filter 110 as shown in FIGS. 1-5. In some example, the micro-lens layer includes various micro-lenses, and locations and areas of the micro-lenses respectively correspond to those of the color filters 108a, 108b and 108c. The incident radiations are condensed by the micro-lenses, and then are converged on the color filters 108a, 108b and 108c correspondingly.

In step 670, the infrared filter layer 116 is disposed to cover the plurality of visible light photosensitive device. In some embodiment, the exemplary infrared filter layer 116 may be disposed conformally on the micro-lens layer as shown in FIG. 1, so that the top surface profile of the infrared filter layer 116 is in a rounding shape. In some exemplary examples, the top surface profile of the infrared filter layer 116 is substantially the same as a top surface profile of the micro-lens layer 112, and the micro-lens layer 112 and the infrared filter layer 116 collectively form a double-lens structure. When the exemplary infrared filter layer 116 is not disposed conformally on the micro-lens layer, a light guide (as shown in FIGS. 2-5) may be further included in the image sensor. The infrared filter layer 116 may be made of an infrared cut-off light filter membrane or an IR cut filter membrane. Materials of the infrared filter layer 116 are not particular limited, in some embodiments, as long as the transmittance of light rays with the wavelength between 400 nanometers to 800 nanometers is permitted, and the transmittance of light rays with the wavelength between 850 nanometers to 1300 nanometers is substantially inhibited. In some embodiments, the infrared filter 116 may be formed as a laminated structure including one or more layers. In some embodiments, the infrared filter layer 116 can filter out infrared radiation from the incident radiation, and the image sensor 100 can convert optical signals of the incident radiation with no infrared radiation into digital data or electrical signals at the visible pixels, so as to reproduce a visual-like image. Thus, an image module (not shown) employing the image sensor can be fabricated without an additional infrared filter element disposed over the image sensor.

In some embodiments, step 670 may be performed before step 660, such that the exemplary image sensors 100, 200 and 500 as shown in FIGS. 1, 2 and 5 can be obtained. In some embodiments, step 670 may be performed after step 660, such that the exemplary image sensor 300 as shown in FIG. 3 can be obtained. Also, in some embodiments, step 670 may be performed before step 620, such that the exemplary image sensor 400 as shown in FIG. 4 can be obtained.

In some embodiments, the infrared filter layer 116 includes an absorptive infrared filter structure (not shown) for reducing the infrared reflection. The absorptive infrared filter structure may be formed from absorptive materials, such as phosphorus pentoxide ($P_2O_5$) and cupric oxide (CuO). In some embodiments, the infrared filter layer 116 includes a reflective infrared filter structure (not shown). For example, the reflective infrared filter structure may be a multi-film stacked structure, and films of the multi-film stacked structure have different refractive indexes in an infrared region for reflecting the infrared radiation. By integrating the infrared filter layer 116 into the image sensor 100, an additional infrared filter element can be omitted. Thus, a glass substrate of the infrared filter element can be removed from the lens module (not shown) employing the image sensor 100 to reduce the thickness of the lens module, so that the image module is effectively thinned. Therefore, the image module can be implemented into a thin electronic device, such as a thin mobile phone.

In various examples, as shown in FIGS. 1-5, the image sensor optionally includes an anti-reflective coating (ARC) layer 120, in which the anti-reflective coating layer 120 is disposed directly on the plurality of visible light photosensitive devices and the infrared photosensitive device. Thus, the anti-reflective coating layer 120 is located between the substrate 102 and the color filters 108a, 108b and 108c and also between the substrate 102 and the infrared band-pass filter 110. With the anti-reflective coating layer 120, the amount of the radiation entering the visible light photosensitive devices 104a, 104b and 104c and the infrared photosensitive devices 106 is increased.

With the infrared filter layer 116 and the infrared band-pass filter 110, a pure IR electrical signal and visible light electrical signals can be simultaneously obtained, to benefit night visibility and avoid sunshine interference. Therefore, an additional infrared filter element can be omitted, and a glass substrate holding the infrared filter element can be removed from the lens module employing the image sensor 100 to reduce the thickness of the lens module, thereby effectively thinning the image module. Such that, the image module can be implemented into a thin electronic device, such as a thin mobile phone.

In some embodiment, the infrared filter layer 116 is disposed on the micro-lens layer 112 and has a substantially planar top surface, and a light guide 114 may be formed on the infrared filter layer after step 670. As such, the light guide 114 is disposed on a top surface and adjacent to a side surface of the infrared filter layer 116 as shown in FIG. 5. Then, the light guide 114 on a top surface of the infrared filter layer 116 may be optionally removed while the light guide 114 adjacent to a side surface of the infrared filter layer 116 is remained, as shown in FIGS. 2-4. In some other embodiment, the light guide of the present disclosure may further extend down the anti-reflective coating (ARC) layer 120 such that the light guide is also interposed between the color filter 108c and the infrared band-pass filter 110 (not shown). According to some aspects of the present disclosure, materials of the exemplary light guide 114 are not particularly limited, as long as they can provide the exemplary light guide 114 with a refractive index less than the color filters 108a, 108b, 108c, the infrared filter layer 116, the infrared band-pass filter 110 and the transparent layer 118. In other words, the exemplary light guide 114 has a refractive index less than the elements adjacent thereto.

In some embodiment, a transparent layer 118 may be further formed to cover the infrared photosensitive device after forming the light guide 114, such that the light guide 114 is interposed between the infrared filter layer 116 and the transparent layer 118 as shown in FIGS. 2 and 5. Materials of the exemplary transparent layer 118 are not particularly limited, and can be any conventional transparent photoresistor in the art.

In accordance with an embodiment, the present disclosure discloses an image sensor. The image sensor includes a substrate, a plurality of visible light photosensitive devices, an infrared photosensitive device, a plurality of color filters, an infrared band-pass filter, a micro-lens layer and an infrared filter layer. The plurality of visible light photosensitive devices and the infrared photosensitive device are disposed in the substrate, wherein the plurality of visible light photosensitive devices and the infrared photosensitive device are arranged in an array. The plurality of color filters are respectively disposed to cover the plurality of visible light photosensitive device. In addition, the infrared band-pass filter disposed to cover the infrared photosensitive device. Furthermore, the micro-lens layer is disposed on the plurality of color filters and the infrared band-pass filter. The infrared filter layer is disposed to cover the plurality of visible light photosensitive device.

In accordance with another embodiment, the present disclosure discloses a method for manufacturing an image sensor. In this method, a plurality of visible light photosensitive devices and an infrared photosensitive device are formed in the substrate, wherein the plurality of visible light photosensitive devices and the infrared photosensitive device are arranged in an array, and each of the visible light photosensitive devices is formed to sense an infrared light and one visible light. A plurality of color filters are formed to respectively cover the plurality of visible light photosensitive devices. In addition, an infrared band-pass filter is formed to cover the infrared photosensitive device. Furthermore, a micro-lens layer is formed on the plurality of color filters and the infrared band-pass filter. An infrared filter layer is formed to cover the plurality of visible light photosensitive device.

In accordance with still another embodiment, the present disclosure discloses an image sensor. The image sensor includes a substrate, a plurality of visible light photosensitive devices, an infrared photosensitive device, a plurality of color filters, an infrared band-pass filter, a micro-lens layer, an infrared filter layer, a transparent layer, a light guide. The plurality of visible light photosensitive devices and the infrared photosensitive device are disposed in the substrate, wherein the plurality of visible light photosensitive devices and the infrared photosensitive device are arranged in an array. The plurality of color filters are disposed respectively to cover the plurality of visible light photosensitive devices. The infrared band-pass filter is disposed to cover the infrared photosensitive device. In addition, the micro-lens layer is disposed on the plurality of color filters and the infrared band-pass filter. Furthermore, the infrared filter layer is disposed to cover the plurality of visible light photosensitive device. The transparent layer is disposed to cover the infrared photosensitive device. The light guide disposed between the infrared filter layer and the transparent layer, wherein the light guide has a refractive index less than the infrared filter layer and the transparent layer. The image sensor further including an anti-reflective coating layer directly on the plurality of visible light photosensitive devices and the infrared photosensitive device.

What is claimed is:

1. An image sensor, comprising:
    a substrate;
    a plurality of visible light photosensitive devices disposed in the substrate;
    an infrared photosensitive device disposed in the substrate, wherein the plurality of visible light photosensitive devices and the infrared photosensitive device are arranged in an array;
    a plurality of color filters respectively disposed to cover the plurality of visible light photosensitive devices;
    an infrared band-pass filter disposed to cover the infrared photosensitive device;
    a micro-lens layer disposed on the plurality of color filters and the infrared band-pass filter;
    a light guide disposed between a portion of the micro-lens layer associated with the infrared photosensitive device and another portion of the micro-lens layer associated with the plurality of visible light photosensitive devices; and
    an infrared filter layer disposed to cover the plurality of visible light photosensitive device.

2. The image sensor of claim 1, wherein the infrared filter layer is disposed conformally on the micro-lens layer.

3. The image sensor of claim 1, wherein the infrared filter layer is disposed on the micro-lens layer and has a substantially planar top surface.

4. The image sensor of claim 1, wherein the light guide has a refractive index less than the color filters and the infrared band-pass filter.

5. The image sensor of claim 1, wherein the infrared filter layer is disposed between the plurality of color filters and the micro-lens layer.

6. The image sensor of claim 1, wherein the infrared filter layer is disposed between the plurality of color filters and the plurality of visible light photosensitive devices.

7. The image sensor of claim 1, further comprising an anti-reflective coating layer disposed directly on the plurality of visible light photosensitive devices and the infrared photosensitive device.

8. The image sensor of claim 1, further comprising a transparent layer disposed correspondingly over the infrared photosensitive device.

9. The image sensor of claim 8, wherein the light guide has a refractive index less than the color filters and the transparent layer.

10. A method for fabricating an image sensor, the method comprising:
    providing a substrate;
    forming a plurality of visible light photosensitive devices in the substrate;
    forming an infrared photosensitive device in the substrate, wherein the plurality of visible light photosensitive devices and the infrared photosensitive device are arranged in an array;
    forming a plurality of color filters to respectively cover the plurality of visible light photosensitive devices;
    forming an infrared band-pass filter to cover the infrared photosensitive device;
    forming a micro-lens layer on the plurality of color filters and the infrared band-pass filter;
    forming a light guide between a portion of the micro-lens layer associated with the infrared photosensitive device and another portion of the micro-lens layer associated with the plurality of visible light photosensitive devices; and
    forming an infrared filter layer to cover the plurality of visible light photosensitive device.

11. The method of claim 10, wherein the infrared filter layer is conformally formed on the micro-lens layer.

12. The method of claim 10, wherein the infrared filter layer is disposed on the micro-lens layer and has a substantially planar top surface.

13. The method of claim 10, wherein the light guide has a refractive index less than the color filters and the infrared band-pass filter.

14. The method of claim 10, wherein the infrared filter layer is formed before forming the plurality of color filters.

15. The method of claim 10, wherein the infrared filter layer is formed after forming the plurality of color filters and before forming the micro-lens layer.

16. The method of claim 10, further comprising: forming an anti-reflective coating layer directly on the plurality of visible light photosensitive devices and the infrared photosensitive device.

17. An image sensor, comprising:
    a substrate;
    a plurality of visible light photosensitive devices disposed in the substrate;
    an infrared photosensitive device disposed in the substrate, wherein the plurality of visible light photosensitive devices and the infrared photosensitive device are arranged in an array;
    a plurality of color filters disposed respectively to cover the plurality of visible light photosensitive devices;
    an infrared band-pass filter disposed to cover the infrared photosensitive device;
    a micro-lens layer disposed on the plurality of color filters and the infrared band-pass filter;

an infrared filter layer disposed to cover the plurality of visible light photosensitive device;

a transparent layer disposed to cover the infrared photosensitive device; and a light guide disposed between the infrared filter layer and the transparent layer, wherein the light guide has a refractive index less than the infrared filter layer and the transparent layer.

18. The image sensor of claim 17, further comprising an anti-reflective coating layer directly on the plurality of visible light photosensitive devices and the infrared photosensitive device.

* * * * *